United States Patent [19]

Courbot

[11] Patent Number: 4,464,951
[45] Date of Patent: Aug. 14, 1984

[54] MECHANICAL CONTROL ASSEMBLY

[75] Inventor: Pierre Courbot, Villiers le Bel, France

[73] Assignee: Societe Anonyme D.B.A., Paris, France

[21] Appl. No.: 371,752

[22] Filed: Apr. 26, 1982

[30] Foreign Application Priority Data

May 29, 1981 [FR] France ................................. 81 10719

[51] Int. Cl.³ .............................................. F16C 1/10
[52] U.S. Cl. ............................ 74/501.5 R; 192/111 A
[58] Field of Search .............. 74/501 R, 501.5 R, 506; 192/111 A, 99 S; 188/196 R

[56] References Cited

U.S. PATENT DOCUMENTS

| | | | |
|---|---|---|---|
| 3,365,042 | 1/1968 | Smirl et al. | 192/99 S X |
| 4,066,154 | 1/1978 | Ross | 192/111 A X |
| 4,181,209 | 1/1980 | Wheaton | 192/111 A |
| 4,266,649 | 5/1981 | Falzoni | 192/111 A |
| 4,310,086 | 1/1982 | Mochida | 192/111 A |
| 4,381,053 | 4/1983 | Hyodo | 192/99 S X |

FOREIGN PATENT DOCUMENTS

| | | |
|---|---|---|
| 2160278 | 4/1973 | Fed. Rep. of Germany . |
| 2847257 | 5/1980 | Fed. Rep. of Germany . |
| 2428281 | 4/1980 | France . |
| 2441507 | 6/1980 | France . |
| 1235083 | 9/1971 | United Kingdom . |
| 1411467 | 10/1975 | United Kingdom . |

*Primary Examiner*—Leslie A. Braun
*Assistant Examiner*—Frank H. McKenzie, Jr.
*Attorney, Agent, or Firm*—Larry J. Palguta; Paul D. Schoenle; K. C. Decker

[57] ABSTRACT

The mechanical control comprises a pedal (10) pivotally mounted on a fixed shaft (12), a cable (26) having one first end (25) connected to a receiver (34) and the second end (27) connected to the pedal (10) by means of a transmission device, the transmission device comprising a force-transmitting element (22) pivotally mounted on the fixed shaft (12) and on an outer cylindrical surface (40) of which the cable (26) is wound, a locking system causing the force-transmitting element (22), the cable (26) and the pedal (10) to be connected for rotation when the latter pivots from its rest position by an angle greater than a predetermined minimum angle αm, a spring (56) being disposed between the second end (27) of the cable and the pedal (10) for tensioning the cable (26). The locking system acts by catching the cable (26) between a first catching surface (42) formed on the force-transmitting element (22) and a second catching surface (44) formed on the pedal (10).

The mechanical control is more particularly intended for cable control of a receiver comprising friction members liable to become progressively worn with use of this receiver and also including resilient return means exerting a force which the mechanical control must overcome to actuate the receiver.

9 Claims, 7 Drawing Figures

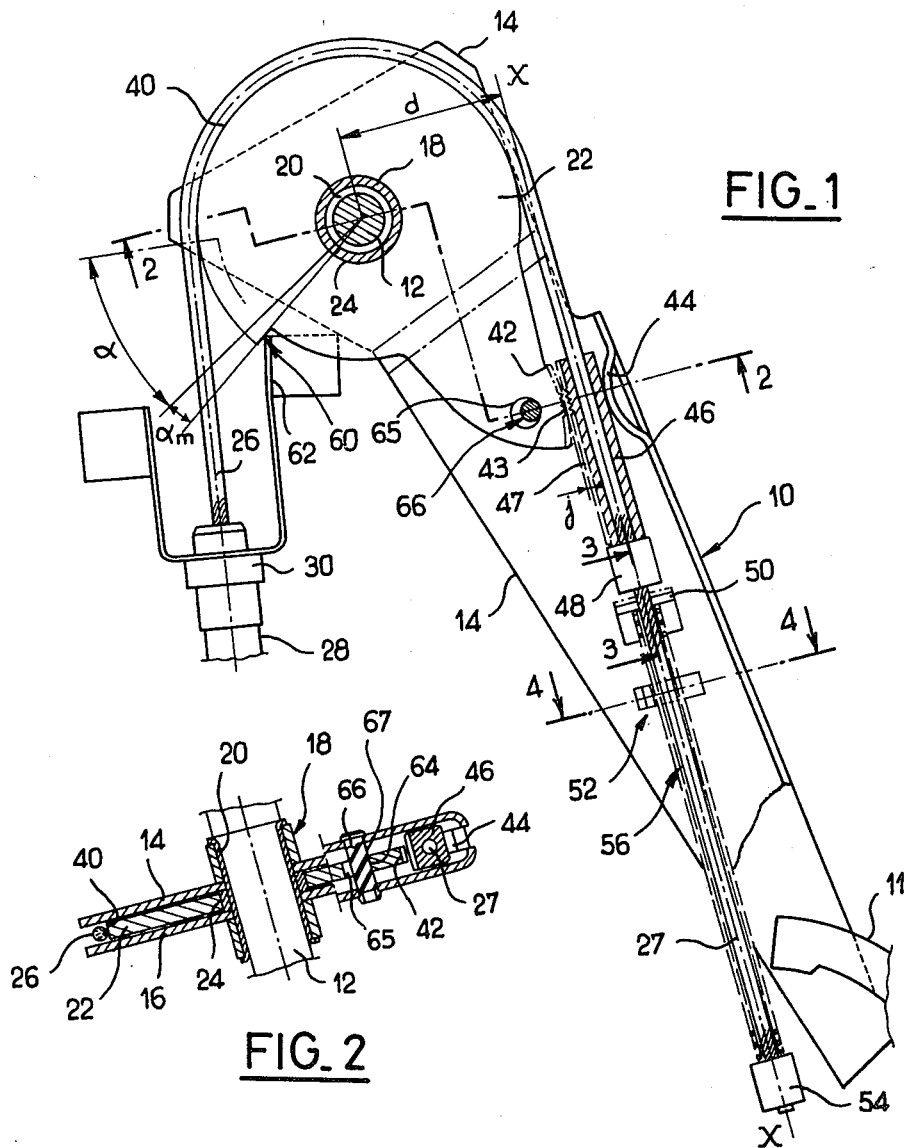
FIG_1
FIG_2
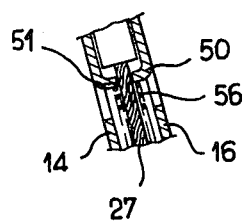
FIG_3
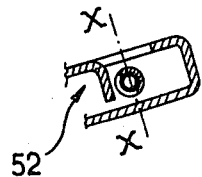
FIG_4

MECHANICAL CONTROL ASSEMBLY

The present invention relates to a mechanical control assembly more particularly intended for cable control or a receiver comprising engaging or friction members liable to become worn progressively with the use of this receiver and also including resilient return means exerting a force which the control must overcome to actuate said receiver. This type of receiver consists generally in a diaphragm friction clutch or in brakes of the types currently used on motor vehicles.

The invention relates more particularly to a mechanical control assembly of the type conprising an actuating pedal pivotally mounted on a shaft fixed to a frame, e.g. of a vehicle, which is operated by means of a transmission element mounted rotatably on said fixed shaft a control cable, one end of which is coupled to said transmission element, connecting means allowing said transmission element and said pedal to be connected for rotation when the latter pivots from its rest position by an angle greater than a predetermined minimum angle $\alpha m$, and an adjustment spring provided to urge the transmission element to rotate about said fixed shaft in the direction corresponding to the tensioning of said cable in order to achieve automatically take up of the play which can appear in the chain of the mechanical control and especially that resulting from wear on friction pads of the receiver or from elongation of the control cable. A mechanical control assembly of this type is described in British patent GB 1 181 920, published Feb. 18, 1970.

Mechanical control assemblies of a similar type are described in French patent application No. 79-14311 (published Jan. 4, 1980, under the No. 2 428 281) and No. 78-32450 (published June, 13, 1980, under the No. 2 441 507).

The group of mechanisms cited hereinbefore, although allowing automatic take up of play which can appear in the control to be obtained correctly, are not sufficiently reliable and safe. In practice, in each of thesemechanisms, the connecting means allowing the pedal and the pivoting transmission element to be connected for rotation are constituted by a pawl or a pinion mounted to pivot about a shaft fixed to the pedal and cooperating with a toothed sector formed on the transmission element. In the case where a pawl is used, the latter is kept permanently in contact engagement with the toothed sector by means of a spring. With such an arrangement, it has been stated that, in the event of wear or breakage of the teeth formed on the toothed sector or of the spring of the pawl, or of the pivoting shaft of the pawl or of the pinion, the user, e.g. the driver, finds it impossible to actuate the receiver by means of the pedal mounted in the passenger space of the vehicle.

In this type of control, return of the pedal to its rest position is effected by a pedal return spring. These pedal springs are generally constituted by tension springs which are drawn, at each actuation of the pedal, over a stroke corresponding to complete actuation of the pedal, and are therefore subject to very considerable fatigue stresses which can very rapidly cause breaking of the pedal return spring.

In the group of control mechanisms mentioned hereinbefore, one end of the cable is fixed to said transmission element which is mounted to rotate on the fixed shaft. It will therefore be understood that automatic take up of play can only be obtained if said transmission element is acutally free to pivot about the fixed shaft under the action of the adjustment spring when the various components of the mechanical control are in rest position; in the case of seizing of the transmission element on the fixed shaft, automatic take up of play cannot be obtained.

An object of the invention is to eliminate all the major disadvantages just mentioned and to provide a novel, single and reliable mechanical control assembly of the considered class.

To this end, according to the invention, there is provided a mechanical control assembly for a receiver of the type comprising engaging members and resilient return means exerting onto at least one said engaging members a force which the mechanical control must overcome to actuate said receiver, said mechanical control assembly comprising a pedal pivotally mounted on a fixed shaft, a cable having a first end adapted to be connected to said receiver and a second end connected to the pedal by means of a transmission device, characterized in that said transmission device comprises a force-transmitting element pivotally mounted on said fixed shaft and having an outer cylindrical surface onto which said cable is pivotally wound, a locking system causing said force-transmitting element, said cable and said pedal to be connected for rotation when the latter pivots from its rest position by an angle greater than a predetermined minimum angle $\alpha m$, and a spring disposed between said second end of the cable and said pedal for tensioning said cable.

According to another feature of the invention, said force-transmitting element is provided with a first stop surface adapted for cooperating with a fixed stop member when said force-transmitting element is in rest position, and with a second stop surface adapted for cooperating with a stop surface formed on said pedal to define said rest postion of the pedal.

According to the invention, the locking system acts by catching said cable between a first catching surface formed on said force-transmitting element and a second catching surface formed on said pedal, said second catching surface cooperating with said first catching surface through said cable to rotate the force-transmitting element on which the cable is wound to cause said cable to be pulled when the pedal pivots by an angle greater than said predetermined angle.

According to the invention, the single spring of the mechanical control is an adjustment spring of the cylindrical helical compression type slipped onto said cable and bearing on one hand on said second end of the cable and on the other hand on a supporting lug formed on said pedal, whereby said cable is tensioned by said spring. The spring is positioned with respect to the pedal so as to cause same to rotate about the fixed shaft in the direction towards its rest position until said second stop surface comes into contact engagement with the stop surface formed on the pedal to define said rest position of the pedal.

The invention will now be described in detail with reference to the attached drawings in which:

FIG. 1 is a traverse sectional view of a mechanical control according to the teaching of the present invention;

FIG. 2 is a sectional view along line 2—2 of FIG. 1;

FIG. 3 is a sectional view along line 3—3 of FIG. 1 of a detail embodiment of the mechanical control;

FIG. 4 is a sectional view along line 4—4 of FIG. 1 of a detail of the embodiment of the mechanical control;

Figure 5:
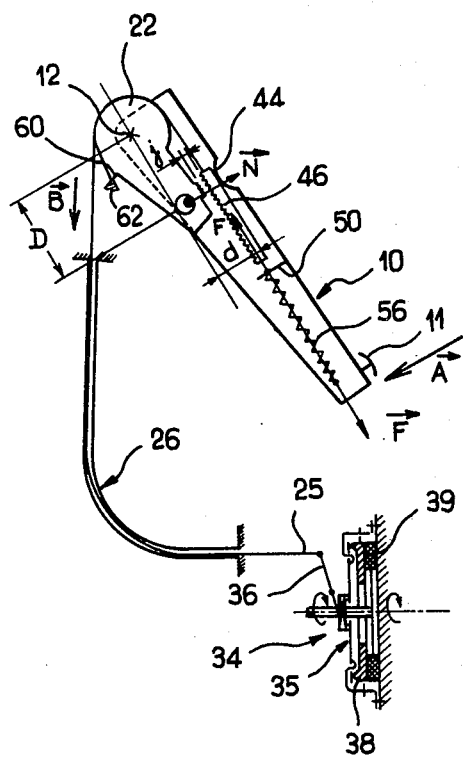
FIG. 5 is a diagrammatic view of the mechanical control represented in FIG. 1 applied to the control of a motor vehicle friction clutch, represented in its engaged condition.

The mechanical control according to the invention generally comprises a pedal 10 mounted to pivot on a shaft 12 fixed to a frame, e.g. the chassis (not shown) of a motor vehicle. The pedal 10 is comprised by two lateral side plates 14 and 16 fixed on a cylindrical sleeve 18 formed in three parts, which constitutes a spacer member and which is tightly fitted on a hollow shaft 20. The hollow shaft 20 is rotatingly supported on the fixed shaft 12. In the illustrated embodiment, the two lateral plates are made of a single piece of folded sheet metal.

The mechanical control further includes a disc-shaped force-transmitting element 22 pivotally mounted on the sleeve 18 received within a central bore 24 of the element 22. As can be seen from FIG. 2, the force-transmitting element 22 is laterally guided by the side plates 14 and 16.

The mechanical control includes a cable 26 slidingly extending through a sheath 28 which is abuttingly connected, via a stop member 30, to a stationary part of the chassis of the vehicle. As can be seen from FIG. 5, the first or outer end 25 of the cable 26 is adapted to be connected to the receiver member, constituted in the represented example by a transmission friction clutch 34. The clutch 34 includes a clutch fork 36 to which the end 25 of the cable 26 is secured. The fork 36 is mounted to pivot with respect to the chassis of the vehicle and is connected to a clutch plate 38 which is normally kept in contact engagement with a disc 39 provided with friction pads by resilient means for returning the clutch spring 35 bearing on the chassis of the vehicle.

The cable 26 cooperates with the outer peripheral cylindrical surface 40 of the force-transmitting element 22 about which it is wound, when the control is actuated.

The force-transmitting element 22 is one of the components of the transmission device which allows the second or inner end 27 of the cable 26 to be connected to the pedal 10. The transmission device also includes a locking system allowing the force-transmitting element 22, the end 27 of the cable and the pedal 10 to be connected for rotation to cause axial displacement of the cable 26 in the sheath 28 when the mechanical control is actuated. The locking system according to the invention is a system which acts by catching the end 27 of the cable 26 between a first stop surface 42 formed on the force-transmitting element 22 and a second catching surface 44 formed on the pedal 10. In the embodiment illustrated, the second catching surface 44 is constituted by a protrusion or bulge obtained by local deformation of the sheet metal constituting the pedal 10, e.g. of the web portion thereof interconnecting the side plates 14,16. The end 27 of the cable 26 is reinforced there by means of a rigid jacket 46 slipped onto the cable end 27 and fixed with respect to the latter by means of a ferrule 48 fitted on the end 27 of the cable. The rigid jacket 46 is disposd to have at least a portion thereof extending between the two catching surfaces 42 and 44. The end 27 of the cable 26, provided with its rigid jacket 46, is positioned on the pedal 10 by means of a supporting bearing lug 50 formed integral with the pedal 10 and by means of a sheet metal guide 52 also formed advantageously integral with the pedal. The end 27 of the cable 26 is further provided with a cylindrical helical compression spring 56 which is slipped onto the end 27 of the cable and which bears on one hand on a ferrule 54 fitted on the end part of the end 27 of the cable 26 and on the other hand on the supporting lug 50 integral with the pedal 10. The supporting lug 50 and the guide 52 are so disposed that the cable 27 which is tightened or tensioned by the resilient biasing force exerted by the spring 56, exerts on the force-transmitting element 22 a traction force whose direction X—X is at a distance "d" from the fixed shaft 18. The guide 52 and the lug 50 are also so disposed that the rigid jacket 46 is held permanently in contact with the second catching surface 44 formed on the pedal 10. As can be seen from FIG. 1 the rigid jacket 46 and the first catching surface 42 each are provided with teeth 47 and 43, respectively, capable of cooperating together in meshing engagement when the control is actuated.

The rest position of the pedal 10 with respect to the chassis of the vehicle is defined as follows: the force-transmitting element 22 is provided with a first stop surface 60 which cooperates with a fixed stop member 62 of the chassis of the vehicle when the force-transmitting element 22 is in its rest position, as represented in FIG. 1. The force-transmitting element 22 is provided with a second stop surface 64 which, in the embodiment illustrated, consists in the internal side wall of a bore 65 formed in the lower arm portion of the force-transmitting element 22. The second stop surface 64 cooperates with a third stop surface formed on the pedal 10 which is formed in the embodiment illustrated by the external side wall 67 of a cylindrical shaft mounted parallel to the sleeve 18 between the lateral plates 14 and 16 of the pedal. When the various integers of the control assembly are in the rest position represented in FIG. 1, the first stop surface 60 formed on the force-transmitting element 22 is in bearing contact with the fixed stop 62 on the chassis of the vehicle and the third stop surface 67 formed by the external side wall of the shaft 66 is in bearing contact with the second stop surface 64 defined by the internal side wall of the bore 65 formed in the force-transmitting element 22. In this position, and as can be seen from FIG. 1, there is a predetermined clearance "j" between the first catching surface 42 and the external side wall of the rigid sleeve 46 which is in turn in bearing contact with the first catching surface 44. The components of the control assembly are kept in this rest position by the action of the spring 56 on the pedal 10. The resilient return force exerted onto the pedal or pedal-holding force N is equal to:

$$N = \frac{F \times d \times K}{D},$$

where
F is the resilient force exerted by the spring 56 on the cable 27,
d is the distance separating the line XX of action of the force F from the fixed shaft;
D is the distance separating the fixed shaft 12 from the point of contact between the first catching surface 42 and the outer peripheral wall of the rigid jacket 46, and K is a constant.

It will be understood that the spring 56 thus exerts a torque on the pedal 10 which tends to cause the pedal to turn in the anti-clockwise direction, when FIG. 1 is considered, until the third stop surface 67 comes into contact with the second stop surface 64.

Figure 6:
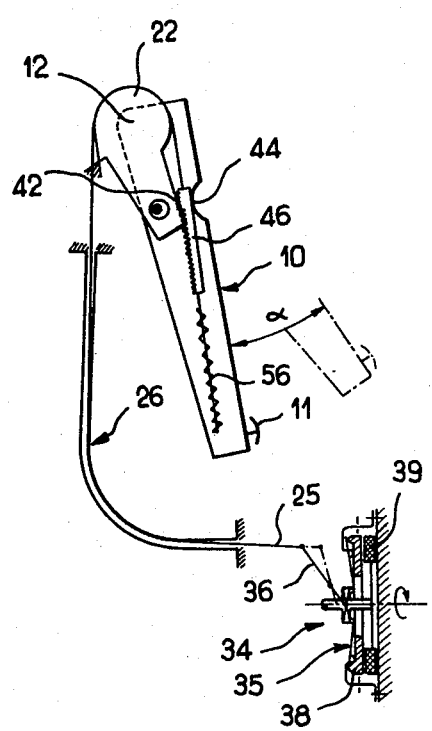
FIG. 6 is a view similar to that of FIG. 5 wherein the clutch is represented in the disengaged condition under the action of the mechanical control.

The operation of the mechanical control assembly will now be described with more particular reference to FIGS. 5 and 6. When the driver wishes to declutch or deactuate the receiver, he applies a force to the end 11 of the pedal 10 in the direction indicated by the arrow A of FIG. 5. Under the action of this force A, the pedal 10 pivots about the fixed shaft 12 by a predetermined minimum angle αm until the first catching surface 42 cones into contact engagement with the outer peripheral surface 47 of the jacket, i.e. until the predetermined clearance "j" is taken up. When the pedal has pivoted by this angle αm, the cable 27 is caught between the catching surfaces 44 and 42 and can therefore no longer be moved in the direction parallel to the direction XX with respect to the pedal 10. If the drivercontinues applying force in the direction A, he causes accordingly the force-transmitting element 22 to be rotated through the rigid jacket 46 and thus the cable 26 to wind on the outer peripheral surface 40 of the force-transmitting element 22. It will be understood that the force-transmitting element thus acts on the cable 26 like a winch and causes axial displacement thereof in the sheath 28. When the driver has caused the pedal 10 to pivot about the fixed shaft 12 by an angle α, the pedal is in the position illustrated in FIG. 6 in which the receiver is in its disengaged position. When the driver progressively releases the effort applied to the end 11 of the pedal 10, the resilient return means 35 of the clutch 34 exerts on the cable 26 a force which tends to move the latter in the direction indicated by the arrow B in FIG. 5. The resilient return force of the clutch 34 applied to the cable 26 causes, as a result of the friction between the external periphery of the cable 26 and the outer peripheral surface 40 of the force-transmitting element 22, said latter to rotate about the fixed shaft 12; this pivoting displacement of the force-transmitting element in the anti-clockwise direction continues until the first stop surface 60 comes into abutment with the fixed stop member 62 of the chassis of the vehicle. When this position has been reached, the pedal continues to pivot about the fixed shaft 12 under the action of the pedal return force N, whose value has been accounted for hereinbefore, until the second stop surface 64 comes into abutment with the third stop surface 67 formed on the pedal 10. When this position is reached, the integers of the control assembly are brought back in the position illustrated in FIGS. 1 and 6, wherein the cable end 27 provided with its rigid jacket 46 is free to slide axially in direction XX with respect to the pedal 10. Such sliding displacement can be produced to take up the wear on the friction pads of the clutch disc. In this instance, the return force of the resilient clutch return means 35 causes movement of the cable 26 which slides on the outer peripheral surface 40 of the force-transmitting element. This sliding of the cable is obtained in opposition to the resilient force F exerted by the pedal spring 56. Sliding of the cable 26 is effected until the friction pads of the receiver are again in contact with the plate. It will be understood that all the play which can occur, due either to slackening of the cable 26 or to wear on the friction pads, is automatically taken up by the mechanical control represented in FIG. 1.

The mechanical control illustrated in FIG. 1 also allows the mounting tolerances of the cable on the vehicle to be compensated for, the rigid jacket 46 being free to move axially with respect to the pedal 10. In order to install the cable on the vehicle, the operator has to compress the spring 56 in bearing engagement on the supporting ferrule 54 so that he can introduce the end 27 of the cable into the aperture 51 of the supporting lug 50 of the pedal 10 and slide the cable into the guide 52. The operator then releases the spring 56 which comes into bearing engagement with the supporting lug 50 and exerts a resilient return torque on the pedal 10 until the latter reaches its rest position.

As it will be apparent from the foregoing, the spring 56 has a double spring function, namely both as an adjustment spring and as a resilient pedal-return spring. The spring 56, compared with conventional pedal-return springs, is practically not subject to traction or compression forces when the mechanical control assembly is actuated and must in fact be regarded as a static spring with respect to the pedal 10. The spring 56 having accordingly no significant force exerted onto it is highly reliable and has an increased serviceable life.

Figure 7:
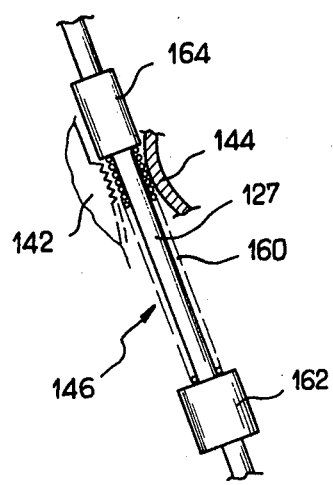
FIG. 7 is a transverse sectional view of a second embodiment of the rigid sleeve of FIG. 1.

FIG. 7 shows an alternative embodiment of the rigid jacket 46 of FIG. 1. In this embodiment, the jacket 146 is here constituted by a compression spring 160 with contiguous turns, which is mounted compressed between two ferrules 162 and 164 fixed on the end portion 127 of the cable 26. Thecontiguous turns of the spring 160 replace the teeth 47 formed on the outer peripheral surface of the rigid jacket 46.

I claim:

1. A mechanical control assembly for a receiver (34) of the type comprising engaging members (39) and resilient return means (35) exerting onto at least one of said members a force which the mechanical control assembly must overcome to acutate said receiver, said mechanical control assembly comprising: a pedal (10) adapted to rotatably pivot on a fixed shaft (12) from and to a rest position; a cable (26) having a first end (25) adapted to be connected to said receiver (34) and a second end portion (27) connected to the pedal (10) by means of a transmission device, characterized in that said transmission device comprises a force-transmitting element (22) pivotally mounted on said fixed shaft (12) and having an outer cylindrical surface (40) onto which said cable (26) is partially wound; a spring means (56) disposed between said second end (27) of the cable and said pedal (10) for tensioning said cable (26); and a locking system causing said force-transmitting element (22), said cable (26) and said pedal (10) to be moved in unison when said pedal (10) pivots from said rest position by an angle greater than a predetermined minimum angle (αm), wherein said locking system acts by catching said cable (26) between a first cathcing surface (42) formed on said force-transmitting element (22) and a second catching surface (44) formed on said pedal (10), said second catching surface (44) cooperating with said first catching surface (42) through said cable (26) to rotate said force-transmitting element (22) to cause said cable to be pulled when said pedal pivots by an angle greater than said predetermined angle (αm).

2. The mechanical control assembly according to claim 1, characterized in that said force-transmitting element (22) is provided with a first stop surface (60) cooperating with a fixed stop member (62) so as to define a rest position for said force-transmitting element (22), and with a second stop surface (64) cooperating with a stop surface (67) formed on said pedal (10) to define said rest position of said pedal.

3. The mechanical control assembly according to claim 2, characterized in that said cable (26) has an external surface portion (47) which is kept permanently in contact engagement with said second catching surface (44) formed on the pedal, said external surface of the cable being separated by a predetermined distance "j" from said first catching surface when said force-transmitting element (22) and said pedal (10) are in their respective rest positions.

4. The mechanical control assembly according to claim 3, characterized in that said cable (26) is provided, near said second end (27), with a jacket (46) slipped onto and fixed on the cable, said external surface of the cable being constituted by the outer wall of said jacket.

5. The mechanical control assembly according to claim 4, characterized in that said outer wall of said jacket is formed with corrugations (47) facing said first catching surface (42).

6. The mechanical control assembly according to claim 5, characterized in that said first catching surface (42) is provided with teeth (43).

7. The mechanical control assembly according to claim 1, characterized in that said spring (56) is a cylindrical helical compression spring slipped onto said cable (26) and in bearing engagement with said second end of the cable and with a supporting lug (50) so formed on said pedal (10) that said cable (26) is tensioned by said spring (56).

8. The mechanical control assembly according to claim 7, characterized in that said spring (56) is positioned on said pedal (10) so as to cause said pedal to rotate about said fixed shaft (12) in the direction toward said rest position of the pedal until said second stop surface (64) comes into contact engagement with said stop surface (67) formed on the pedal (10) to define said rest position of the pedal.

9. A mechanical control assembly according to claim 5, characterized in that said jacket is constituted by a helical cylindrical spring (160) with contiguous turns, said corrugations being constituted by said turns.

* * * * *